United States Patent [19]
Walker

[11] Patent Number: 5,911,787
[45] Date of Patent: Jun. 15, 1999

[54] DYNAMIC RANGE SHIFT ACTUATION

[75] Inventor: James M. Walker, Kalamazoo, Mich.

[73] Assignee: Eaton Corporation, Cleveland, Ohio

[21] Appl. No.: 09/053,095

[22] Filed: Apr. 1, 1998

[51] Int. Cl.[6] .................................................. F16H 59/04
[52] U.S. Cl. .............................................. 74/335; 701/51
[58] Field of Search ................................ 74/335, 336 R; 477/97; 701/51, 58

[56]  References Cited

U.S. PATENT DOCUMENTS

| | | | |
|---|---|---|---|
| 4,754,665 | 7/1988 | Vandervoort | 74/745 |
| 4,920,815 | 5/1990 | Reynolds | 74/335 |
| 4,974,468 | 12/1990 | Reynolds et al. | 74/477 |
| 5,000,060 | 3/1991 | Reynolds et al. | 74/745 |
| 5,222,404 | 6/1993 | Stine | 74/335 |
| 5,370,013 | 12/1994 | Reynolds et al. | 74/330 |
| 5,377,797 | 1/1995 | Mustapha et al. | 192/3.55 |
| 5,390,561 | 2/1995 | Stine | 74/331 |
| 5,582,558 | 12/1996 | Palmeri et al. | 477/109 |
| 5,651,292 | 7/1997 | Genise | 74/745 |
| 5,660,079 | 8/1997 | Friedrich | 74/335 X |

*Primary Examiner*—Khoi Q. Ta
*Attorney, Agent, or Firm*—Howard D. Gordon

[57]  ABSTRACT

A control for enhanced shifting in a computer (48)-assisted vehicular compound transmission system having a having a main section (16A) shifted by a manually operated shift lever (31) and a range section (16B) automatically shifted in response to sensing shift lever (31) passing through a predetermined actuation point (AR) in the shift pattern. A position sensor (160) is provided for sensing the position of the shift lever and logic is provided to vary the location of the actuation point (180, 182, 184) for initiating a range shift.

43 Claims, 6 Drawing Sheets

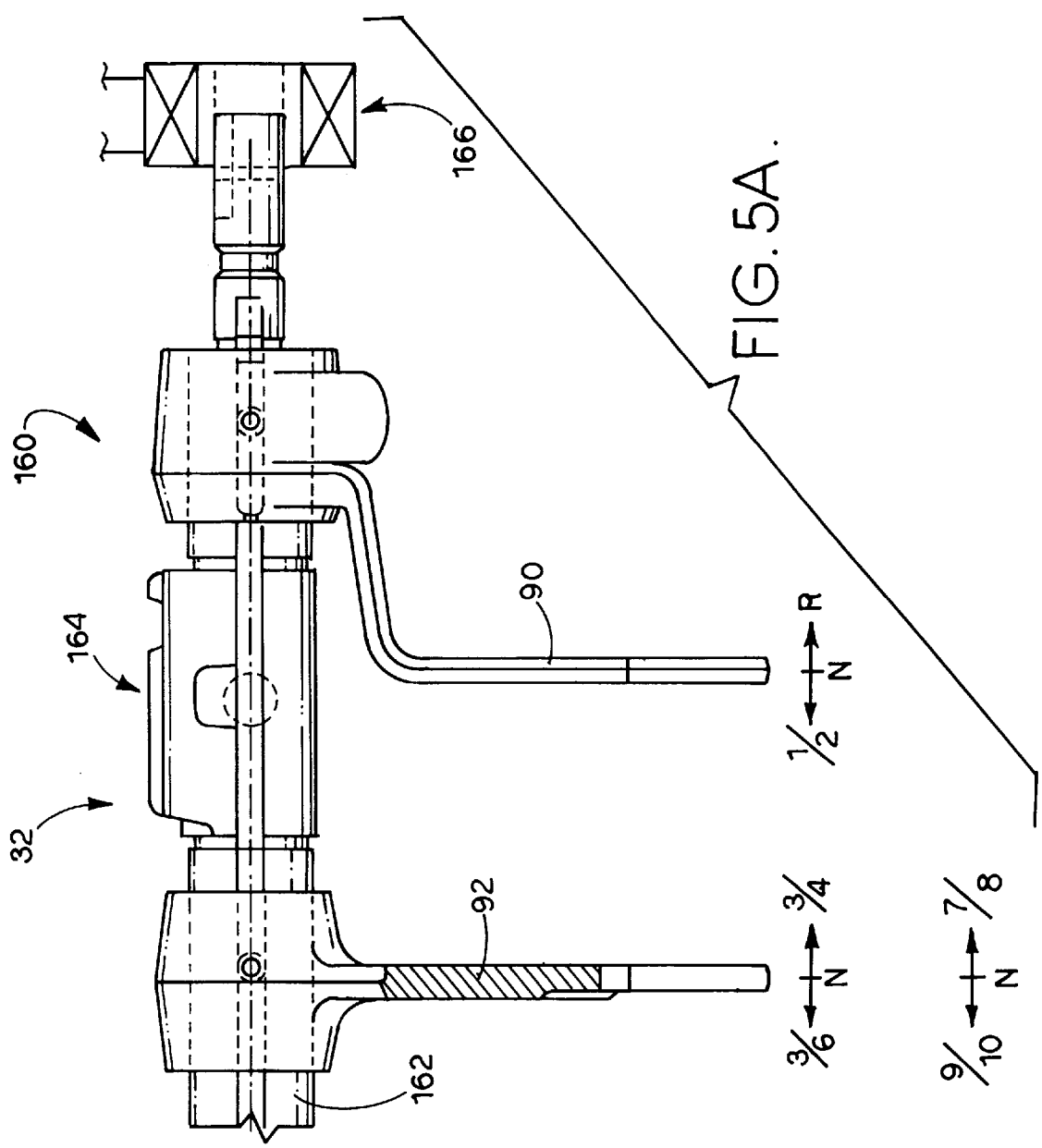

DYNAMIC RANGE SHIFT ACTUATION

BACKGROUND OF THE INVENTION

RELATED APPLICATIONS

This application is related to the following co-pending applications, all assigned to EATON CORPORATION, the assignee of this application:

Ser. No. 08/053,089 [96-TRN-263] mailed Apr. 01, 1998 and titled RANGE SHIFT CONTROL Ser. No. 08/053,093 [97-TRN-561] mailed Apr. 01, 1998 and titled ADAPTIVE UPSHIFT JAW CLUTCH ENGAGEMENT CONTROL Ser. No. 08/053,092 [97-TRN-566] mailed Apr. 01, 1998 and titled ENGINE FUEL CONTROL FOR COMPLETING SHIFTS IN CONTROLLER-ASSISTED, MANUALLY SHIFTED TRANSMISSIONS Ser. No. 08/053,090 [98-TRN-092] mailed Apr. 01, 1998 and titled ADAPTIVE NEUTRAL SENSING Ser. No. 08/053,091 [98-TRN-067] mailed Apr. 01, 1998 and titled JAW CLUTCH ENGAGEMENT CONTROL FOR ASSISTED, MANUALLY SHIFTED, SPLITTER-TYPE TRANSMISSION SYSTEM Ser. No. 08/053,181 [98-TRN-101] mailed Apr. 01, 1998 and titled ADAPTIVE SPLITTER ACTUATOR ENGAGEMENT FORCE CONTROL Ser. No. 08/902,603 filed 08/07/97 and titled PARIALLY AUTOMATED, LEVER-SHIFTED MECHANICAL TRANSMISSION SYSTEM Ser. No. 08/990,678 [97-rTRN-495] mailed Dec. 11, 1997 and titled ASSISTED LEVER-SHIFTED TRANSMISSION.

FIELD OF THE INVENTION

The present invention relates to a control system/method for controlling automatically implemented range shifting in a compound transmission having a main section shifted by a manually operated shift lever or shift selector. In particular, the present invention relates to controls for automatic range shifting which initiate a range shift in response to manual positioning of a shift lever and, more particularly, to such controls which will vary the shift lever position at which a range shift will be initiated in response to sensed vehicle operating conditions, such as vehicle speed and/or previously engaged gear ratio, to provide enhanced range shifting.

DESCRIPTION OF THE PRIOR ART

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems by be seen by reference to U.S. Pat. Nos. 4,455,883; 4,550,627; 4,899,607; 4,920,815; 4,974,468; 5,000,060; 5,272,931; 5,281,902; 5,222,404 and 5,350,561, the disclosures of which are incorporated herein by reference.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292 and 5,679,096; 5,682,790; the disclosures of which are incorporated herein by reference.

The prior art devices with lever position-initiated automatic range shifting were not totally satisfactory, as range shifting was initiated by the lever actuating a fixed position sensor or switch and, thus, the lever position(s) at which automatic range shifting was initiated was fixed.

SUMMARY OF THE INVENTION

A preferred embodiment of the present invention involves a computer-assisted mechanical compound transmission system wherein the main section is shifted by a manually controlled shift lever and the engine is fueled and/or the auxiliary sections are shifted by actuators at least partially controlled by an ECU to enhance shifting. The ECU uses sensed and/or calculated inputs indicative of system operating parameters, such as operation of a splitter switch, position and/or rate of change of position of the shift lever, engaged gear ratio, engine speed, output shaft speed, clutch condition and/or throttle pedal position, to assist shifting by controlling engine fueling and/or operation of the range and/or splitter shift actuators.

In accordance with the present invention, the drawbacks of the prior art are minimized or overcome by the provision of a computer-enhanced, lever-shifted compound vehicular transmission system having a position sensor for sensing shift lever position and logic for sensing/determining vehicle operating conditions and varying the shift lever position at which automatically implemented range shifts are initiated as a function of vehicle operating conditions to enhance system performance.

Accordingly, it is an object of the present invention to provide ECU assistance for enhanced shifting of a mechanical compound transmission having a main section shifted by a manually operated shift lever.

Another object of the present invention is to provide an improved range-type compound transmission having lever position-initiated, automatically implemented range shifting.

These and other objects and advantages of the present invention will become apparent from a reading of the following description of the preferred embodiment taken in connection with the attached drawings.

BRIEF DESCRIPTION OF THE DRAWINGS

FIGS. 5A and 5B are schematic illustrations of a shift shaft position sensor mechanism for use in the system of FIG. 1.

DESCRIPTION OF THE PREFERRED EMBODIMENT

Figure 1:
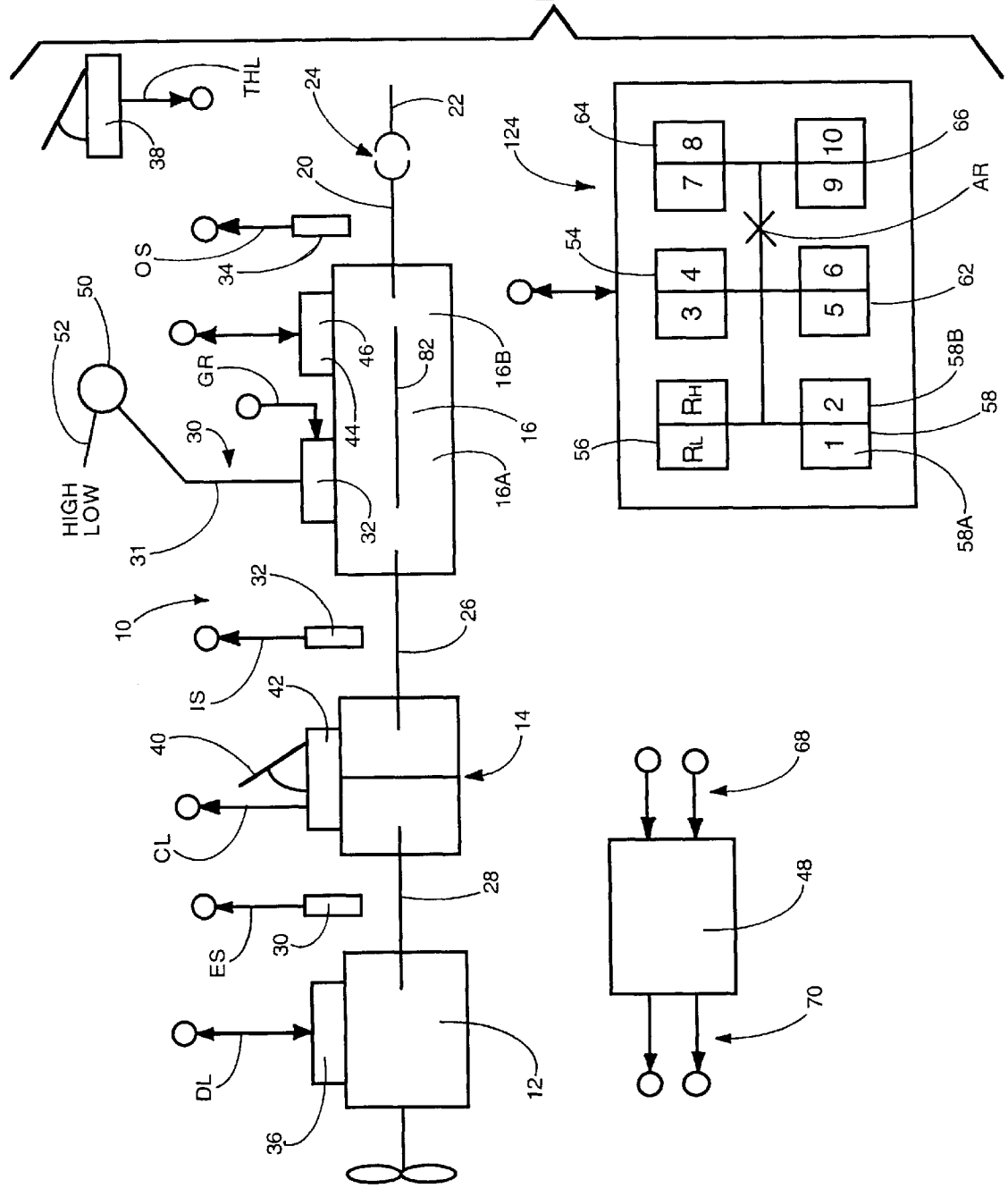
FIG. 1 is a schematic illustration of an ECU-assisted compound mechanical transmission system advantageously utilizing the range shifting control of the present invention.

A computer-assisted (i.e., microprocessor-based, controller-assisted) vehicular compound mechanical transmission system 10, particularly well suited to utilize the enhanced range shifting control system/method of the present invention, may be seen by reference to FIGS. 1–5B.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft 22 by a universal joint 24 for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

Figure 2:
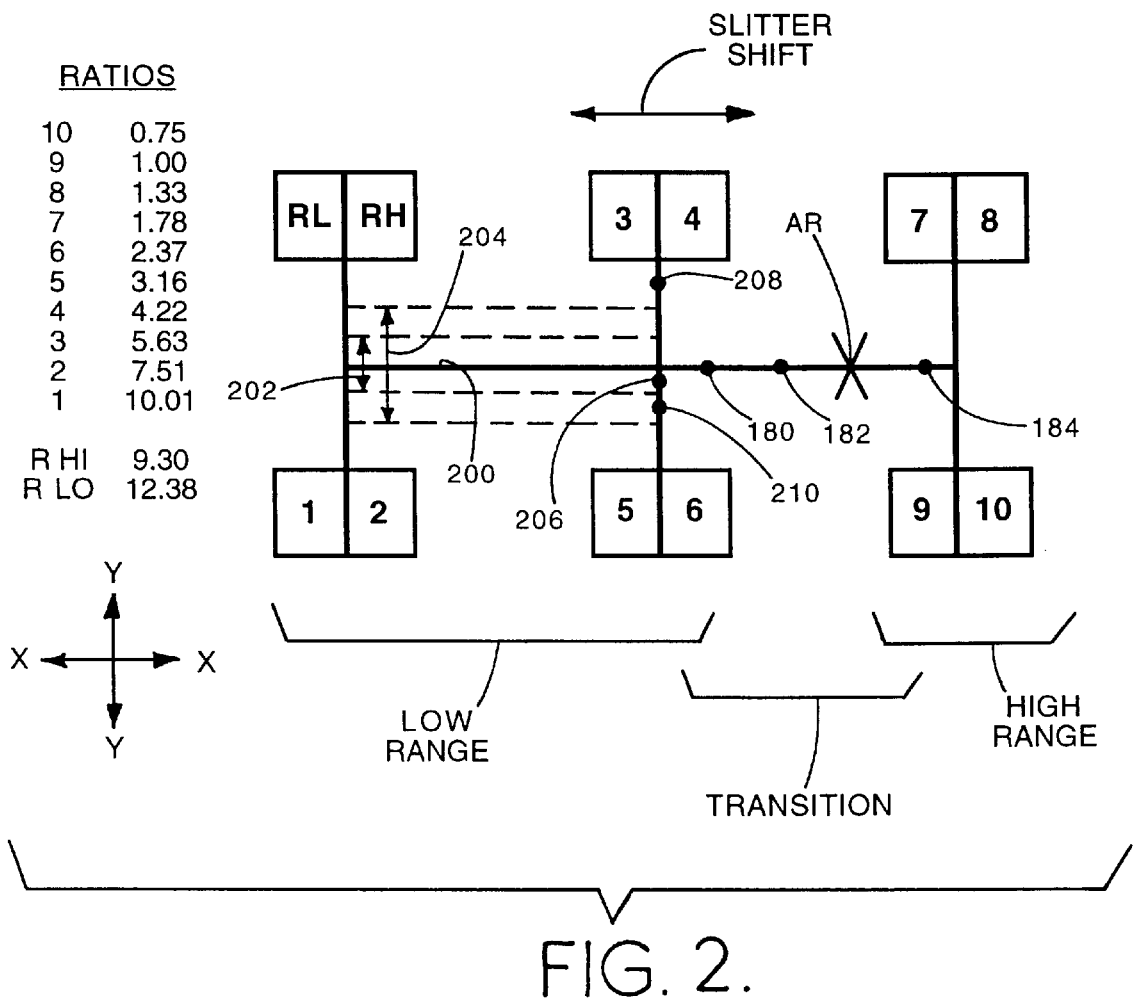
FIG. 2 is a chart illustrating the shift pattern and representative numerical ratios for the transmission of FIG. 1.

FIG. 2 illustrates a shift pattern for assisted manual shifting of a combined range-and-splitter-type compound transmission shifted by a manually operated shift lever. Briefly, the shift lever 31 is movable in the side-to-side or X—X direction to select a particular ratio or ratios to be engaged and is movable in the fore and aft or Y—Y direction to selectively engage and disengage the various ratios. The shift pattern (usually referred to as an "H-type" shift pattern) includes an automatic range shifting feature and may include automatically selected and/or implemented splitter shifting, as is known in the prior art. Manual transmissions utilizing shift mechanisms and shift patterns of this type are well known in the prior art and may be appreciated in greater detail by reference to aforementioned U.S. Pat. Nos. 5,000,060 and 5,390,561.

Typically, the shift lever assembly 30 will include a shift finger or the like (not shown) extending downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

In the automatic range shifting feature, as the shift lever moves in the transition area or band between the middle leg (¾–⅝) and the righthand leg (⅞–⁹⁄₁₀) of the shift pattern, it will cross a point, AR, which will actuate a sensor, such as a magnetic, mechanical or electrical range switch, or will be sensed by a position sensor, to cause initiation of automatic implementation of a range shift.

Shifting of transmission 16, comprising main section 16A coupled in series to auxiliary section 16B, is semi-automatically implemented/assisted by the vehicular transmission system 10, illustrated in FIGS. 1–5B. Main section 16A includes an input shaft 26, which is operatively coupled to the drive or crank shaft 28 of the vehicle engine 12 by master clutch 14, and output shaft 20 of auxiliary section 16B is operatively coupled, commonly by means of a drive shaft 24, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16 are manually selectable by manually positioning the shift lever 31 according to the shift pattern prescribed to engage the particular desired change gear ratio of main section 16A.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal. Input shaft speed sensor 32 may be eliminated and engine speed (ES), as sensed by a sensor or over a data link (DL), substituted therefor.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque ($T_{EG}$) and base engine friction torque ($T_{BEF}$) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from ECU 48. The shift lever 31 has a knob 50 which contains splitter selector switch 52 by which a driver's intent to initiate a splitter shift may be sensed.

System 10 may include a driver's display unit 54 including a graphic representation of the six-position shift pattern with individually lightable display elements 56, 58, 60, 62, 64 and 66, representing each of the selectable engagement positions. Preferably, each half of the shift pattern display elements (i.e., 58A and 58B) will be individually lightable, allowing the display to inform the driver of the lever and splitter position for the engaged ratio.

The system includes a control unit or ECU 48, preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or the display unit 54. A separate system controller may be utilized, or the engine controller ECU 36 communicating over an electronic data link may be utilized.

As shown in U.S. Pat. No. 5,651,292 (the disclosure of which is incorporated herein by reference) and co-pending patent application U.S. Ser. No. 08/597,304 (assigned to the assignee of this application), the splitter actuator 46 is, preferably, a three-position device, allowing a selectable and maintainable splitter section neutral. Alternatively, a "pseudo" splitter-neutral may be provided by deenergizing the splitter actuator when the splitter clutch is in an intermediate, non-engaged position.

Figure 3:
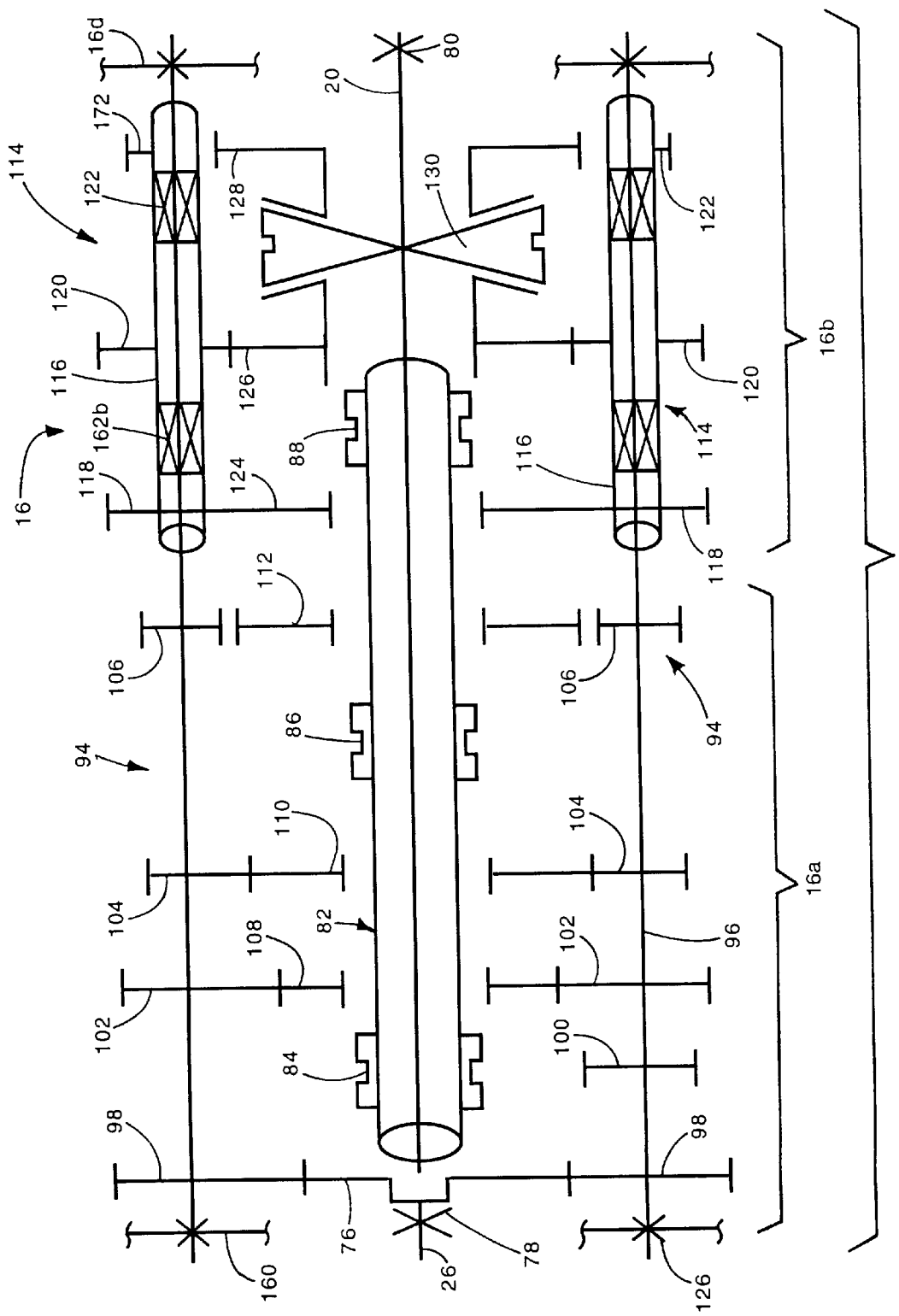
FIG. 3 is a schematic illustration of the structure of the compound mechanical transmission of FIG. 1.

The structure of the 10-forward-speed combined range-and-splitter-type transmission 16 is schematically illustrated in FIG. 3. Transmissions of this general type are disclosed in aforementioned U.S. Pat. Nos. 5,000,060; 5,370,013 and 5,390,561.

Transmission 16 includes a main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith and defines a rearwardly opening pocket wherein a reduced diameter extension of output shaft 20 is piloted. A non-friction bushing or the like may be provided in the pocket or blind bore. The rearward end of input shaft 26 is supported by bearing 78 in front end wall 16C, while the rearward end of output shaft 20 is supported by bearing assembly 80 in rear end wall 16D.

The mainshaft 82, which carries mainshaft clutches 84 and 86, and the mainshaft splitter clutch 88 is in the form of a generally tubular body having an externally splined outer surface and an axially extending through bore for passage of output shaft 20. Shift forks 90 and 92 are provided for shifting clutches 84 and 86, respectively (see FIG. 5A). Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gears 98, 100, 102, 104 and 106 fixed thereto. Gear pairs 98, 100, 102, 104 and 106 are constantly meshed with input gear 76, mainshaft gears 108 and 110 and an idler gear (not shown), which is meshed with reverse mainshaft gear 112, respectively.

Main section countershaft 96 extends rearwardly into the auxiliary section, where its rearward end is supported directly or indirectly in rear housing end wall 16D.

The auxiliary section 16B of transmission 16 includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

Auxiliary countershafts 116 are generally tubular in shape, defining a through bore for receipt of the rearward extensions of the main section countershafts 96. Bearings or bushings are provided to rotatably support auxiliary countershaft 116 on main section countershaft 96.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to a driver selection switch such as a button or the like on the shift knob, as is known in the prior art and to control signals from ECU 48 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Splitter shifting of transmission 16 is accomplished responsive to initiation by a vehicle operator-actuated splitter button 52 or the like, usually a button located at the shift lever knob, while operation of the range clutch shifting assembly is an automatic response to movement of the gear shift lever between the central and rightwardmost legs of the shift pattern and across the actuation point AR, as illustrated in FIG. 2. Alternatively, splitter shifting may be automated (see U.S. Pat. No. 5,435,212). Range shift devices of this general type are known in the prior art and may be seen by reference to aforementioned U.S. Pat. Nos. 3,429,202; 4,455,883; 4,561,325 and 4,663,725.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

In the prior art, especially for manual transmissions, the splitter clutches were operated by two-position actuators and, thus, were provided with a relatively small backlash (i.e., about 0.008–0.012 inches backlash for a clutch having about a 3.6-inch pitch diameter) to prevent unduly harsh splitter shifting. Typically, with the above backlash and the usual engagement forces, at greater than about 60 RPM input shaft synchronous error, the clutch teeth would ratchet or "buzz" and clutch engagement would not occur.

As is known (see U.S. Pat. No. 5,052,535, the disclosure of which is incorporated herein by reference), allowable relative rotational speed at which the positive clutches will properly engaged (i.e., sufficient clutch tooth penetration will occur) is a directly proportional function of the total effective backlash in the clutch system. The maximum allowable asynchronous conditions at which clutch engagement is allowed is selected in view of the most harsh clutch engagement which is acceptable.

In change-gear transmissions utilizing the non-synchronized positive clutch structures, especially for heavy-duty vehicles, for a given total backlash (i.e., a given maximum allowably harsh clutch engagement), the range of asynchronous conditions at which the clutch members will engage is often narrower than desirable under certain conditions, making shifting more difficult.

According to the present invention, and as more fully described in aforementioned U.S. Pat. No. 5,651,292, the interengaging clutch teeth provided on splitter clutch 88 and on splitter gear 124 and splitter/range gear 126 are of a relatively large backlash (i.e., about 0.020–0.060 inches for a 3.6-inch pitch diameter clutch), which will assure that almost any attempted splitter shift under full force will be completed.

Figure 4:
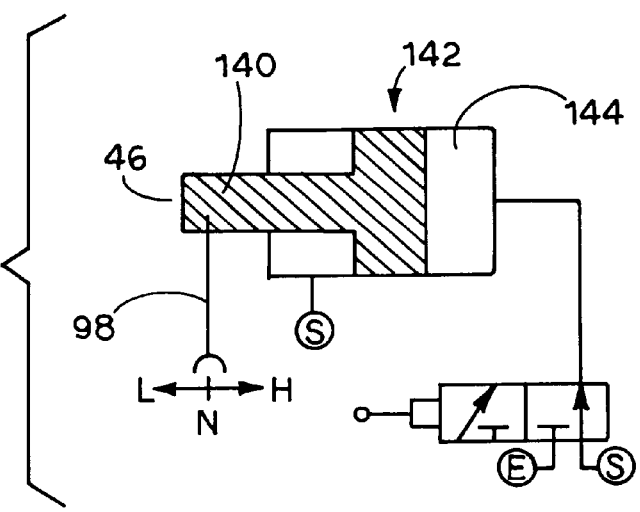
FIG. 4 is a schematic illustration of a three-position splitter actuator for use with the transmission system of FIG. 1.

The clutch 88 is moved by a shift fork 98 attached to the piston rod 140 of the piston actuator assembly 142 (see FIG. 4). Actuator assembly 142 may be a conventional three-position actuator (see U.S. Pat. No. 5,054,591, the disclosure of which is incorporated herein by reference) or an actuator of the type illustrated in U.S. Pat. No. 5,682,790 or 5,661, 998 (the disclosures of which are incorporated herein by reference), wherein pulse width modulation of a selectively pressurized and exhausted chamber 144 may be used to achieve the three splitter positions (L, N, H) of the shift fork.

Preferably, the splitter clutch actuator 142 will be capable of applying a variable force, such as by pulse width modulation, of supply pressure. A force lesser than full force may be utilized when disengaging and/or when synchronous conditions cannot be verified.

The controller 48 is provided with logic rules under which, if the main section is engaged, a shift from splitter neutral into a selected target splitter ratio is initiated such that, under normal conditions, including proper operator fuel control, the synchronous error (which is equal to input shaft rotational speed minus the product of output shaft rotational speed and transmission target gear ratio) is expected to be equal to or less than a value selected to give smooth, high-quality shifts ((IS−(OS*GR))=ERROR ≦REF). The timing is done in regard to sensed/expected shaft speeds, shaft acceleration/deceleration and actuator reaction times.

In certain situations, the logic rules will recognize operating conditions wherein the preferred synchronous window (i.e., IS=(OS*GR) ±60 RPM) must be expanded to accomplish a splitter shift, even at the expense of shift quality. These situations, usually associated with upshifts, include if shifting attempted at low engine speeds wherein expected engine speed at shift completion will be undesirably low, if deceleration of the output shaft is relatively high (dOS/dt<REF), if the deceleration of the engine is relatively low (dES/dt>REF) and/or if the absolute value of the synchronous error is not approaching the normal value at an acceptable rate.

The position of the shift lever 31 or of the shifting mechanism 32 controlled thereby may be sensed by a position sensor device. Various positioning sensing assemblies are known in the prior art, with a preferred type illustrated in allowed U.S. Ser. No. 08/695,052, assigned to the assignee of this application, the disclosure of which is incorporated herein by reference.

Figure 5B:
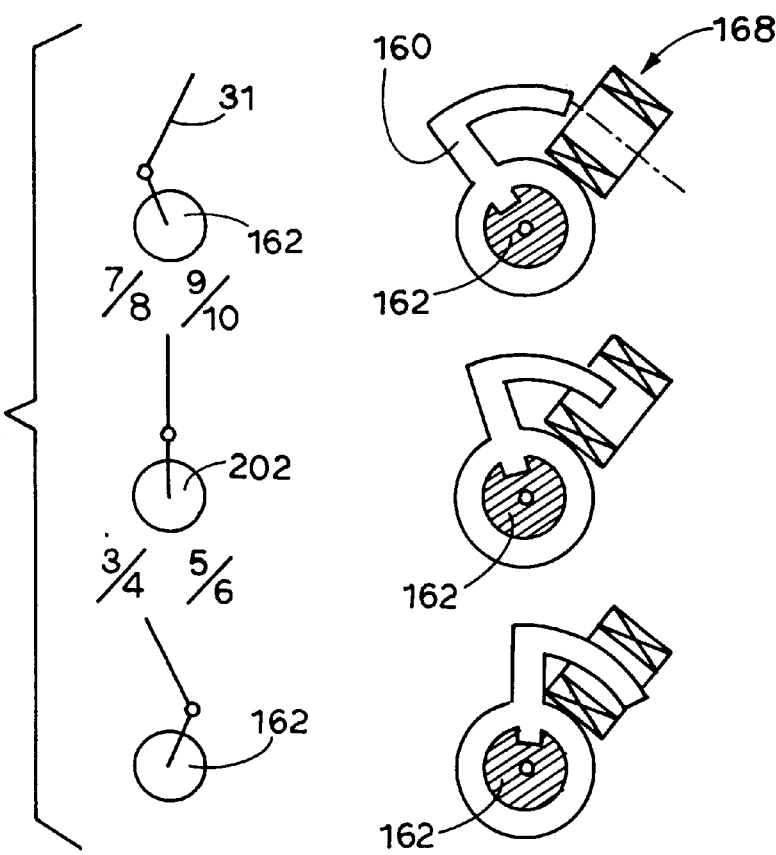
Figure 6:
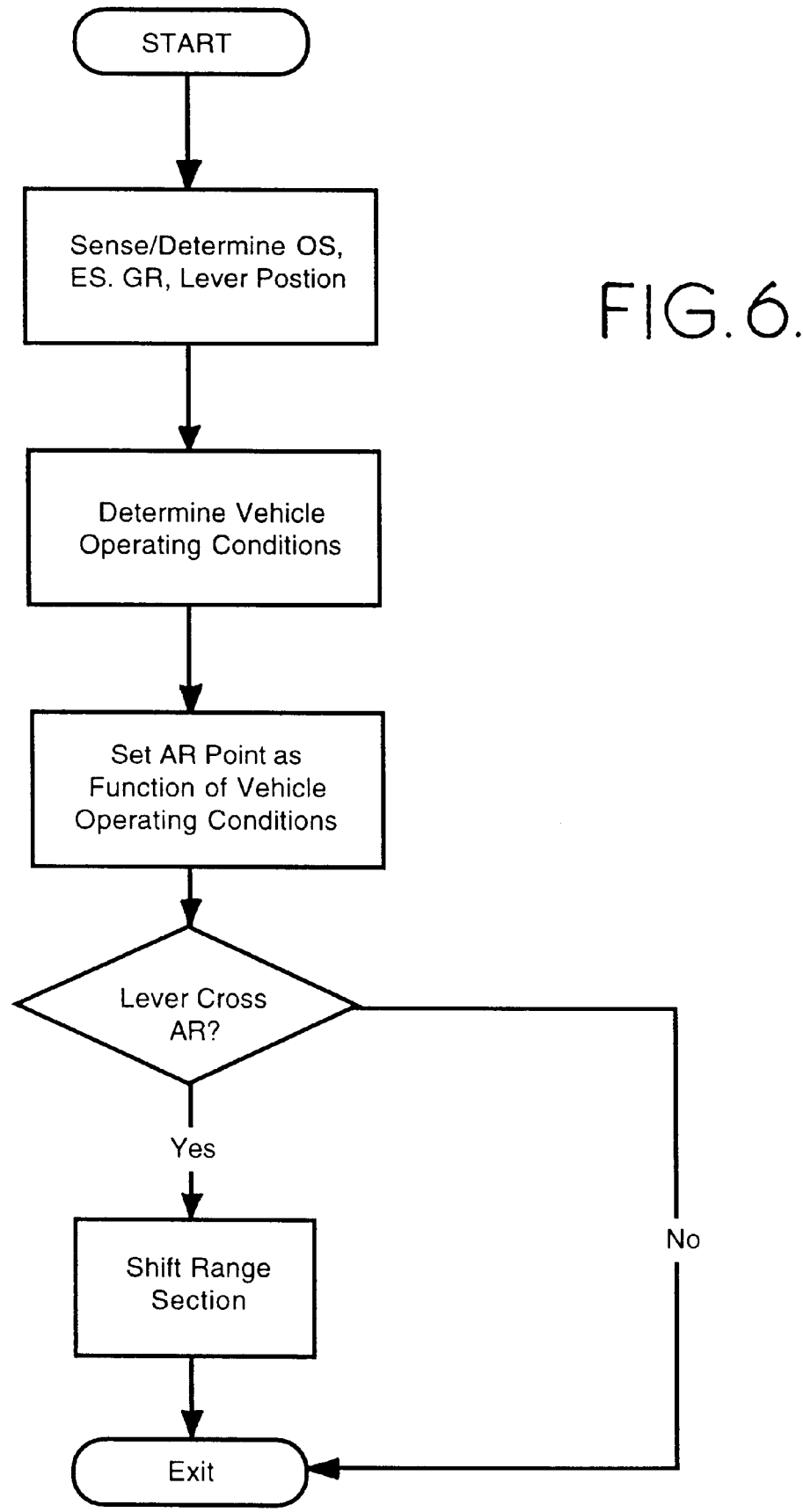
FIG. 6 is a schematic illustration, in flow chart format, of the control of the present invention.

Referring to FIGS. 5A and 5B, shifting mechanism 32 is illustrated as a single shift shaft device 160 having a shaft 162 which is rotatable in response to X—X movements of shift lever 31 and axially movable in response to Y—Y movements of shift lever 31. Mechanisms of this type are described in detail in aforementioned U.S. Pat. No. 4,920, 815.

Shift shaft 162 carries the main section shift forks 90 and 92 for selective axial movement therewith and a shift block member 164 for receiving a shift finger or the like. A pair of coils 166 and 168 provide a pair of signals (collectively GR) indicative of the axial and rotational position of shaft 162 and, thus, of shift lever 31 relative to the shift pattern illustrated in FIG. 2. Preferably, the rate of change of position (dGR/dt) also may be determined and utilized to enhance shifting of the system 10.

By way of example, referring to FIG. 2, if shift lever position can be sensed, the need for a fixed switch or the like at point AR to sense a required initiation of a shift between low range and high range is eliminated.

Further, as physical switches are no longer required, the shift pattern position at which a range shift will be commanded, AR, can be varied, such as to points 180, 182 or 184, to enhance system performance under various operating conditions.

If in first (1st) through fourth (4th), a shift into high range is very unlikely and the auto range shift initiation point may be moved to position 184 (away from the expected shift lever path) to prevent inadvertent actuation of a range shift. If in sixth (6th) with a high engine speed, a shift into high range is likely and moving the auto range initiation point to position 180 will allow for a quicker initiation of a range shift.

Similarly, if in fifth (5th), an intentional shift into high range is only moderately likely, and the range shift initiation point may be moved to position 182.

According to the present invention, the operator is allowed to control engine fueling unless the current vehicle operating conditions indicate that his/her operation of the throttle pedal will not allow the jaw clutches associated with the current target ratio to engage. If operating conditions, including operator setting of the throttle pedal, indicate that the operator will complete a splitter shift into target ratio, the engine will be fueled in accordance with operator throttle setting. If not, automatic engine fueling may occur. If the splitter section does engage prior to the main section, as is preferred, the operator will remain in complete control of engine fueling to complete the shift by engaging the main section.

The state of engagement (i.e., engaged or neutral) of the main transmission section 16A is an important control parameter for system 10. By way of example, if main section neutral is sensed, the splitter may be commanded to a full force engagement, regardless of the existence or absence of synchronous conditions. Also, if the main section is engaged while the splitter is in neutral, the system will not cause splitter engagement until substantial synchronous is sensed and may then initiate automatic fuel control if required. Of course, it is important to prevent or minimize false determinations of main section neutral and/or engaged conditions.

Referring to FIG. 2, a first narrow band 202 and a second wider band 204 of vertical displacements from the bight portion 200 are utilized to determine if the main section is or is not in neutral. If the transmission main section is not confirmed as being in main section neutral, the neutral confirmation band will be the narrower band 202. This will assure that the main section 16A is truly in neutral before declaring a main section neutral condition. If the transmission main section 16A is confirmed as being in neutral, the neutral confirmation band will be the wider band 204. This assures that mere overshooting of neutral or raking of main section jaw clutches will not be incorrectly interpreted as a main section engaged condition.

Sensing the shift lever at point 206 will always be interpreted as main section neutral, and sensing the shift lever at point 208 will always be interpreted as main section engaged. However, if the shift lever is sensed at point 210, this will not cause a previous determination of a neutral or engaged condition to change.

Vehicle operating conditions other than or in addition to currently engaged or neutral condition of the main section 16A may be used to vary the width of the neutral sensing bands.

If in high range and output shaft speed (indicative of vehicle speed) is high, a shift into low range is undesirable or not allowable and the range shift initiation point may be positioned at position 180, or range downshifting may be prohibited by preventing a range downshift command, regardless of shift lever position, or by establishing no range shift initiation point.

As an alternative, a separate position sensor/switch may be established at each potential range shift initiation point (180, 182, 184).

Accordingly, it may be seen that a new and improved computer-assisted, manually shifted, range-type transmission system is provided, which provides enhanced shift lever position-initiated, automatically implemented range shifting.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling shift lever position-actuated, automatically implemented range shifting in a vehicular transmission system comprising a compound transmission having a main transmission section and a range section, a manually operated shift selector for shifting said main transmission section in accordance with an established shift pattern, a range section shift actuator for causing shifts in said range section, a system controller for receiving input signals and processing same according to predetermined logic rules to determine values of control parameters indicative of vehicle operating conditions and to issue command output signals to system actuators including said range section shift actuator, said method comprising:

determining as a function of the values of said control parameters indicative of vehicle operating conditions a variable range shift actuation position (180, 182, 184) in said shift pattern which, if crossed by said shift lever, is indicative of a requirement to initiate automatic implementation of a range shift;

sensing values of position parameters indicative of lever position in said shift pattern; and if lever position if sensed as crossing said range shift actuation position, issuing command signals to initiate a range shift.

2. The method of claim 1 wherein said transmission is driven by a fuel-controlled engine and said input signals include signals indicative of engine rotational speed and vehicle ground speed.

3. The method of claim 1 wherein said input signals include signals indicative of one of currently engaged and previously engaged gear ratio.

4. The method of claim 1 wherein said range section has only two selectably engaged ratios.

5. The method of claim 1 wherein said operating conditions include one of currently engaged and previously engaged gear ratios.

6. The method of claim 1 wherein said operating conditions include vehicle ground speed.

7. The method of claim 5 wherein said operating conditions include vehicle ground speed.

8. The method of claim 1 wherein said shift selector is a manually operated shift lever.

9. The method of claim 1 wherein said operating conditions include engine rotational speed.

10. The method of claim 1 wherein said shift pattern defines an "H"-shaped portion comprising a first leg ($3/4$–$5/6$) for selection of low range ratios, a second leg ($7/8$–$9/10$), parallel and adjacent to said first leg, for selection of high range ratios, and a transition segment, extending perpendicularly between said first and second legs, said range shift actuating positions being located on said transition portion, changes in said operating conditions causing said range shift actuating point to be located at variable spacings from said first and second legs of said shift pattern.

11. The method of claim 10 wherein, if a sensed currently or last engaged gear ratio is the highest ratio (6th) in low range, said actuation point will be located closer to said first than to said second leg.

12. The method of claim 10 wherein, if a sensed currently or last engaged gear ratio is the lowest ratio (1st) in low range, said actuation point will be located closer to said second than to said first leg.

13. The method of claim 11 wherein, if said gear ratio is the lowest ratio (1st) in low range, said actuation point will be located closer to said second than to said first leg.

14. The method of claim 10 wherein, if a sensed currently or last engaged gear ratio is the lowest ratio (7th) in high range, said actuation point will be located closer to said second than to said first leg.

15. The method of claim 10 wherein, if a sensed currently or last engaged gear ratio is the highest ratio in high range, said actuation point will be located closer to said first than to said second leg.

16. The method of claim 14 wherein, if said gear ratio is the highest ratio in high range, said actuation point will be located closer to said first than to said second leg.

17. The method of claim 11 wherein, if said gear ratio is the lowest ratio (7th) in high range, said actuation point will be located closer to said second than to said first leg.

18. A system for controlling shift lever position-actuated, automatically implemented range shifting in a vehicular transmission system comprising a compound transmission having a main transmission section and a range section, a manually operated shift selector for shifting said main transmission section in accordance with an established shift pattern, a range section shift actuator for causing shifts in said range section, a system controller for receiving input signals and processing same according to predetermined logic rules to determine values of control parameters indicative of vehicle operating conditions and to issue command output signals to system actuators including said range section shift actuator, said system comprising:

means for determining as a function of the values of said control parameters indicative of vehicle operating conditions a variable range shift actuation position (180, 182, 184) in said shift pattern which, if crossed by said shift lever, is indicative of a requirement to initiate automatic implementation of a range shift;

means for sensing values of position parameters indicative of lever position in said shift pattern; and means effective, if lever position if sensed as crossing said range shift actuation position, for issuing command signals to initiate a range shift.

19. The system of claim 18 wherein said transmission is driven by a fuel-controlled engine and said input signals include signals indicative of engine rotational speed and vehicle ground speed.

20. The system of claim 18 wherein said input signals include signals indicative of one of currently engaged and previously engaged gear ratio.

21. The system of claim 18 wherein said operating conditions include one of currently engaged and previously engaged gear ratios.

22. The system of claim 18 wherein said operating conditions include vehicle ground speed.

23. The system of claim 18 wherein said operating conditions include engine rotational speed.

24. The system of claim 18 wherein said shift pattern defines an "H"-shaped portion comprising a first leg (3/4–5/6) for selection of low range ratios, a second leg (7/8–9/10), parallel and adjacent to said first leg, for selection of high range ratios, and a transition segment, extending perpendicularly between said first and second legs, said range shift actuating positions being located on said transition portion, changes in said operating conditions causing said range shift actuating point to be located at variable spacings from said first and second legs of said shift pattern.

25. The system of claim 24 wherein, if a sensed currently or last engaged gear ratio is the highest ratio (6th) in low range, said actuation point will be located closer to said first than to said second leg.

26. The system of claim 24 wherein, if a sensed currently or last engaged gear ratio is the lowest ratio (1st) in low range, said actuation point will be located closer to said second than to said first leg.

27. The system of claim 25 wherein, if said gear ratio is the lowest ratio (1st) in low range, said actuation point will be located closer to said second than to said first leg.

28. The system of claim 24 wherein, if a sensed currently or last engaged gear ratio is the lowest ratio (7th) in high range, said actuation point will be located closer to said second than to said first leg.

29. The system of claim 24 wherein, if a sensed currently or last engaged gear ratio is the highest ratio in high range, said actuation point will be located closer to said first than to said second leg.

30. The method of claim 28 wherein, if said gear ratio is the highest ratio in high range, said actuation point will be located closer to said first than to said second leg.

31. A computer controller for controlling shift lever position-actuated, automatically implemented range shifting in a vehicular transmission system comprising a compound transmission having a main transmission section and a range section, a manually operated shift selector for shifting said main transmission section in accordance with an established shift pattern, a range section shift actuator for causing shifts in said range section, a system controller for receiving input signals and processing same according to predetermined logic rules to determine values of control parameters indicative of vehicle operating conditions and to issue command output signals to system actuators including said range section shift actuator, said computer programmed for:

determining as a function of the values of said control parameters indicative of vehicle operating conditions a variable range shift actuation position (180, 182, 184) in said shift pattern which, if crossed by said shift lever, is indicative of a requirement to initiate automatic implementation of a range shift;

sensing values of position parameters indicative of lever position in said shift pattern; and if lever position if sensed as crossing said range shift actuation position, issuing command signals to initiate a range shift.

32. The computer controller of claim 31 wherein said transmission is driven by a fuel-controlled engine and said input signals include signals indicative of engine rotational speed and vehicle ground speed.

33. The computer controller of claim 31 wherein said input signals include signals indicative of one of currently engaged and previously engaged gear ratio.

34. The computer controller of claim 31 wherein said operating conditions include one of currently engaged and previously engaged gear ratios.

35. The computer controller of claim 31 wherein said operating conditions include vehicle ground speed.

36. The computer controller of claim 31 wherein said transmission is driven by a fuel-controlled engine and said operating conditions include engine rotational speed.

37. The computer controller of claim 31 wherein said shift pattern defines an "H"-shaped portion comprising a first leg (3/4–5/6) for selection of low range ratios, a second leg (7/8–9/10), parallel and adjacent to said first leg, for selection of high range ratios, and a transition segment, extending perpendicularly between said first and second legs, said range shift actuating positions being located on said transition portion, changes in said operating conditions causing said range shift actuating point to be located at variable spacings from said first and second legs of said shift pattern.

38. The computer controller of claim 37 wherein, if a sensed currently or last engaged gear ratio is the highest ratio (6th) in low range, said actuation point will be located closer to said first than to said second leg.

39. The computer controller of claim 37 wherein, if a sensed currently or last engaged gear ratio is the lowest ratio (1st) in low range, said actuation point will be located closer to said second than to said first leg.

40. The computer controller of claim 38 wherein, if said gear ratio is the lowest ratio (1st) in low range, said actuation point will be located closer to said second than to said first leg.

41. The computer controller of claim 27 wherein, if a sensed currently of last engaged gear ratio is the lowest ratio (7th) in high range, said actuation point will be located closer to said second than to said first leg.

42. The computer controller of claim 37 wherein, if a sensed currently or last engaged gear ratio is the highest ratio in high range, said actuation point will be located closer to said first than to said second leg.

43. The computer controller of claim 41 wherein, if said gear ratio is the highest ratio in high range said actuation point will be located closer to said first than to said second leg.

* * * * *